Patented Sept. 4, 1951

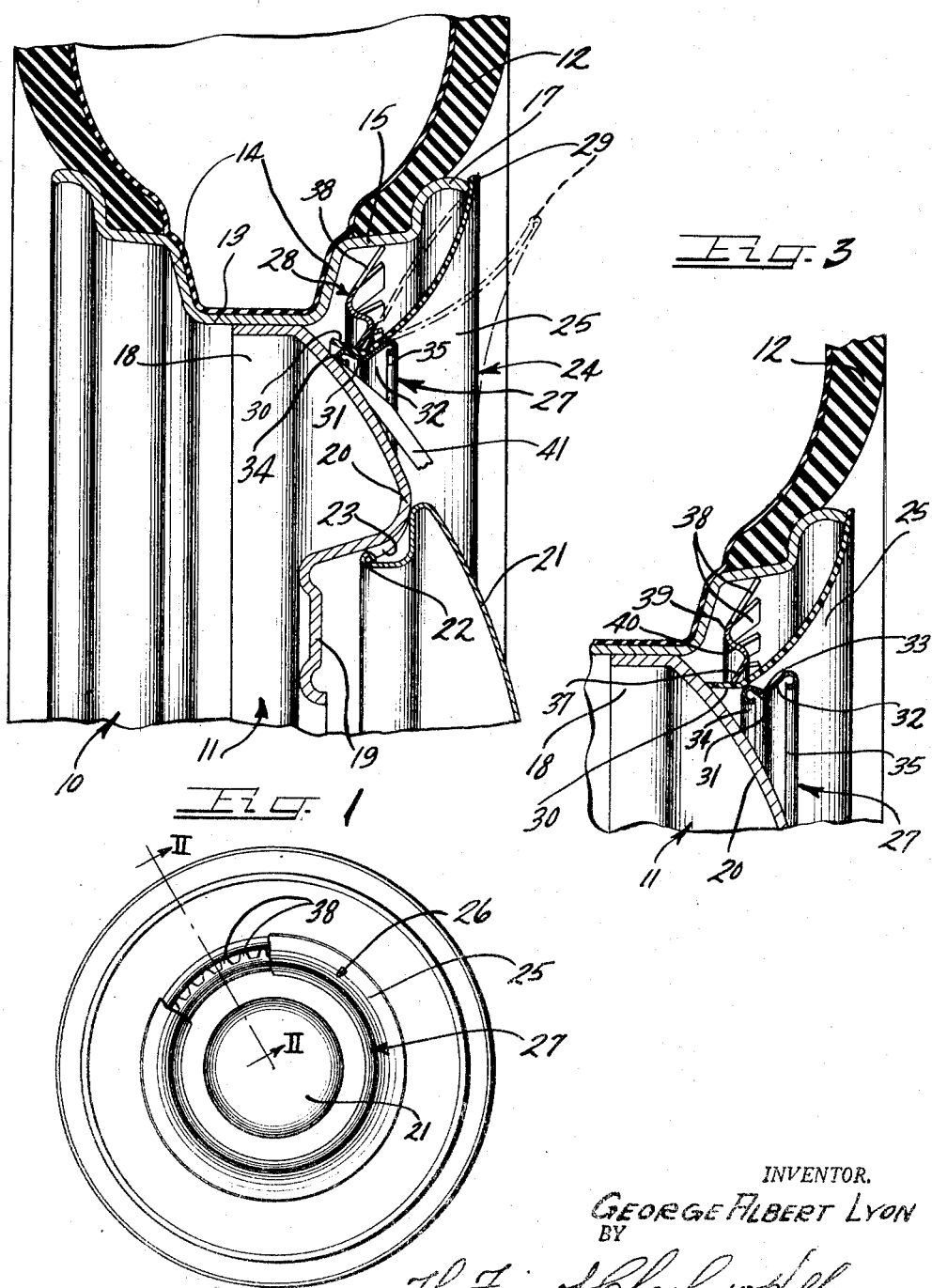

2,566,345

UNITED STATES PATENT OFFICE 2,566,345

WHEEL COVER

George Albert Lyon, Allenhurst, N. J.

Application November 18, 1946, Serial No. 710,452

10 Claims. (Cl. 301—37)

This invention relates to a wheel structure and more particularly to a wheel and wheel cover assembly including novel retaining means for an ornamental wheel trim.

An object of this invention is to provide in a wheel structure an improved snap-on wheel trim or cover including separable retaining members one of which is adapted to be secured more or less permanently to the wheel while another is separable for replacement of the wheel trim.

Another obect of the invention is to provide improved retaining means for a plastic wheel trim wherein one portion of the retaining means is adapted to engage a tire rim in more or less permanent pressed-on relationship and another portion of the retaining means is adapted to be separably assembled with said permanent engaging means for detachably clamping the trim ring in assembly thus permitting the trim ring to be disassembled for replacement purposes.

Still another object of this invention is to provide a wheel cover or trim with retaining means which is simple in construction and which may be effectively engaged with the wheel and yet permits the trim to be easily replaced when it is desired to do so.

In accordance with the general features of this invention there is provided a plastic trim ring for a wheel including a multi-flanged tire rim and wheel body, the trim ring being held in place in concealing relation to the tire rim by retaining means comprising a retaining ring having generally radially and axially outwardly extending fingers more or less permanently bitingly engageable with an intermediate flange of the tire rim and providing one portion of a clamp structure, the other portion of which is separably interengageable with the fingered retaining ring to clamp an innermarginal portion of the plastic trim ring therebetween, the separably interengageable retaining member being adapted to be readily pried free from the fingered retaining member for releasing the plastic trim ring.

Another feature of the invention relates to the provision in a structure of the aforesaid character of relatively cooperable retaining members formed from relatively resilient sheet metal for clamping the plastic trim ring and holding it against separation from the wheel but permitting free flexure of the trim ring in an axial direction.

Yet another feature of the invention resides in the formation of the separable retaining member of the retaining means with a portion which serves to form a backing for the inner portion of the plastic trim ring whereby to reinforce the trim ring against flexure stresses.

Other features, objects and advantages of the present invention will more fully appear from the following detailed description taken in connection with the accompanying drawings illustrating one embodiment thereof, and in which:

Figure 1 is a side view of a wheel structure having a cover or trim embodying the features of the present invention and wherein the cover portion is partly broken away to show details of the retaining means therebehind;

Figure 2 is an enlarged, fragmentary, radial, sectional view taken substantially along the line II—II of Figure 1; and Figure 3 is a fragmentary, sectional view taken in substantially the same plane as Figure 2 but showing the retaining members separated.

As shown on the drawings:

A wheel structure with which the present invention is adapted to be utilized comprises a multi-flanged tire rim 10 carried by a load bearing body portion 11 and adapted to support a conventional tire and tube assembly 12.

The tire rim 10 is of the drop center type having an axial base flange 13, generally radially outwardly extending inner flanges 14, generally axially extending intermediate flanges 15, and terminal flanges 17.

The load bearing wheel body 11 may be stamped from suitable gauge sheet metal and has an outer, axially extending marginal flange 18 secured to the base flange 13 of the tire rim. The inner margin of the body member 11 is formed as a radially extending bolt on flange 19 by which the wheel structure is adapted to be secured detachably to a part on the axle of the vehicle by means of bolts or cap screws (not shown).

Intermediate the flanges 18 and 19, the body part 11 is formed with a generally axially outwardly bulged annular reinforcing nose portion 20. Cooperating with the nose portion 20 is a hub cap 21 which is formed with a marginal axially inwardly extending flange 22 formed for snap-on, pry-off engagement with inwardly extending bumps 23 on the radially inner side of the nose portion 20.

Between the radially outer side of the nose portion 20 and the intermediate flange 15 of the tire rim exists a relatively deep annular axially outwardly opening groove within which is mounted an ornamental cover 24 for concealing the tire rim 10 and such appurtenances as balancing weights that may be carried by the flange 17 and the usual valve stem which projects through the axially outermost of the rim flanges 14.

According to the present invention, the cover 24 comprises a trim ring 25 having a valve stem access opening 26, and retaining means for the trim ring including cooperating radially inner and outer clamping ring members 27 and 28, respectively.

By preference, the trim ring member 25 is formed from a resiliently flexible material such as a synthetic plastic material such as ethyl cellulose, cellulose acetate or vinyl resin. These synthetic plastics are adapted to be molded by heat and pressure and afford a smooth, easily cleaned surface. In addition, the trim ring member 25 is thereby adapted to be substantially locally flexed axially and upon release of the flexing pressure returns of its own resilience to the non-flexed original shape or position. It thereby retains its shape and resists permanent deformation such as sheet metal is subject to in use while at the same time permitting the trim ring to be flexed inwardly or open for access therebehind when necessary.

As shown, the plastic trim ring member 25 is formed with a concave, convex cross-section on a curvature generally simulating the curvature of the adjacent side wall of the tire 12. Where colored white the trim ring appears as a white side wall inward extension of the tire and thereby affords a desirable and distinctive appearance for the tire, as though the tire extended clear down to the body part 11 of the wheel.

At its outer edge, the trim ring member 25 has a slightly turned out reinforcing flange 29 which serves also as a marginal, locating bead in assembling the trim ring with the terminal flange 17 of the tire rim. From the engagement with the tire rim flange 17 the trim ring 25 curves radially and axially inwardly toward the radially outer portion of the nose 20 of the wheel body. At its inner margin, the trim ring 25 is formed with a generally axially extending annular flange 30 which in a free condition is adapted to engage at its free edge with the wheel body 11 adjacent to the juncture of the nose portion 20 with the attachment flange 18 of the body (Fig. 3).

The retaining members 27 and 28 are constructed and arranged to engage the inner marginal flange portion 30 of the trim ring therebetween and hold the trim ring against displacement relative to the wheel. To this end, the inner retaining member 27 is adapted to be made from suitable sheet metal and is in the form of a ring facing generally radially outwardly, having an axially inner portion 31 and an axially outer portion 32 convergent radially inwardly to provide a radially outwardly opening, shallow groove 33 within which the shoulder convergence between the body of the trim ring 25 and the inner marginal flange 30 thereof is adapted to seat. The free edges of the retaining ring portions 31 and 32 are formed with respective inturned, reinforcing beads 34 and 35. Since the retaining member 27 is exposed at the axially outer side of the radially inner portion of the trim ring 25, it is preferably formed from stainless steel or other decoratively polished material. It will be apparent, however, that the retaining ring 27 may be formed from a suitable plastic material and in such case may be of a contrasting color to the color of the trim ring 25.

In assembly, a generally radially inwardly and axially inwardly extending inner marginal flange 37 on the outer retaining ring 28 is adapted to engage with the inner face of the inner marginal flange 30 adjacent to the juncture thereof with the trim ring body and clamp the flange 30 against the shoulder provided by the inner trim ring portion 31.

Attachment of the cover assembly to the wheel is accomplished by wedgingly engaging radially and axially outwardly extending teeth 38 on the outer retaining ring 28 with the radially inner face of the outer intermediate flange 15 of the tire rim. To this end, the construction of the outer retaining ring 28 is preferably of suitable relatively stiff yet inherently resilient sheet metal with the fingers 38 extending from a flange 39 which is offset in a generally axial direction from the clamping flange 37 by means of a generally S-shaped cross section intermediate body portion 40 which reinforces the retaining ring 28 against axial deformation and cooperates with the flanges 37 and 39 to afford a certain amount of axial as well as radial flexibility to enhance the retaining function of the outer retaining ring 28.

In applying the cover assembly to the wheel the fingers 38 of the outer retaining ring member 28, either while the retaining ring 28 is in the assembled relationship or before it is assembled with the trim ring 25 and the inner retaining ring 27, are wedgingly, bitingly engaged with the radially inner face of the intermediate rim flange 15 by pressing the retaining ring 28 axially inwardly into the assembled relationship. For this purpose, the retaining fingers 28, are, of course, initially disposed to extend more nearly radially outwardly and to a greater diameter than the inner diameter of the intermediate flange 15. Hence, when the retaining ring member 28 is pressed axially inwardly, the retaining fingers 28 are pressed axially outwardly and bear radially outwardly into the wedging, biting engagement with the rim flange 15. Through this arrangement, the outer retaining ring 28 is adapted to be more or less permanently affixed to the tire rim 10.

In mounting the cover assembly, the retaining ring 28 is pressed toward the adjacent inner flange 14 of the tire rim to such a distance axially inwardly but spaced from the tire rim side flange 14 that the inner clamping flange 37 holds the inner retaining ring member 27 with the inner axial bead 34 thereof engaging the wheel body 11.

When it is desirable to release the trim ring 25 from the retaining rings 27 and 28, this can be readily effected by prying the inner retaining ring 27 free from the outer retaining ring 28 as by means of a pry-off tool 41 such as a screwdriver. This can conveniently be inserted under the inner reinforcing bead 34 for effecting dislodgment of the inner retaining ring 27 by a twisting of the tool 41 or a leverage action thereof against the nose 20 of the wheel body.

Since the inner shoulder flange portion 31 of the inner retaining ring 27 in assembly lies partially axially inwardly and radially outwardly of the inner edge of the retaining ring clamping flange 37, the disassembly movement of the inner retaining ring 27 past the clamping flange 37 tends to cause a certain amount of relative radial deflection in the clamping flange 37 or in the inner ring clamping flange 31, or in both such flanges.

A certain amount of such flexure or deflection in the clamping flange 37 is permitted by the offsetting body portion 40 of the outer retaining ring 28. This resilient interaction of the clamping flanges not only facilitates assembly and disassembly of the inner retaining ring 27 but also assures a thorough trim ring clamping action of the retaining rings in spite of manufacturing inaccuracies that may be present.

When the inner retaining ring 27 is detached, the trim ring member 25 can be readily axially removed or replaced since the inner marginal flange 30 thereof is released, substantially as shown in Fig. 3. In replacing the trim ring 25, the inner marginal flange 30 thereof is placed in encircled relation to the clamping flange 37 of the outer retaining ring and preferably bearing edgewise against the wheel body. Thereupon, the inner retaining ring member 27 is moved inwardly and the inner clamping flange portion 31 thereof pressed past the clamping flange 37, sliding along the inner face of the interposed marginal flange 30 of the trim ring, until the bead 34 passes the flange 37. Thence, the retaining rings snap into assembled clamping relationship with the inner marginal flange 30 of the trim ring clamped securely therebetween.

The relationship of the trim ring and the retaining rings is such, moreover, that in the fully assembled relationship thereof with the wheel, the trim ring 25 is held under tension against the terminal flange 13 of the tire rim.

In the fully assembled relation it will be apparent from Fig. 2, that not only may the trim ring member 25 be deflected inwardly as shown in dash outline but it may also be deflected outwardly as shown in dot-dash outline. Inward deflection is facilitated by the divergently spaced relationship between the outer flange 32 of the inner retaining ring and the clamping flange 37 of the outer retaining ring. The outward deflection of the trim ring 25 is of course feasible because of the relatively narrow, radially inner portion thereof which is engaged by the inner retaining ring member 27. In such outward flexure, the axially outer flange 32 of the inner retaining ring member affords a backing for the inner flexed marginal portion of the trim ring and thereby reinforces it against flexure strains which might otherwise in the course of much flexure concentrated at one point tend to cause the cover to fatigue and break.

The turned, axially outer reinforcing bead 35 affords a smooth, rounded edge for the inner retaining ring which further facilitates strain free flexure of the trim ring 25, and avoids any danger of a set or crease occurring in the trim ring if it is bent far back on itself.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A wheel structure including a multi-flanged tire rim, a circular wheel cover for the outer side of the tire rim comprising a trim ring member and a pair of retaining rings having cooperating respective annular groove and retaining edge formations for clampingly engaging the inner marginal portion of the trim ring member, one of said retaining ring members having means thereon for attachment to the wheel, said trim ring member having an inner marginal flange extending generally axially and flexibly connected thereto and held in flexed condition between said retaining ring members within the groove formation by the edge formation.

2. In a cover structure for a wheel including a multi-flanged tire rim part and a wheel body part, an annular cover member adapted to be disposed in concealing relation to the rim part, and retaining means for the cover comprising a pair of retaining ring members clampingly engaging an inner marginal portion of the cover, one of said ring members having radially inwardly converging portions defining a radially outwardly opening groove, and the other of said members including a clamping flange engaging the marginal portion of the cover member and keeping it in said groove, one of said retaining rings having means thereon for attachment of the assembly to the wheel, said means for attaching the cover to the wheel comprising a radially outwardly extending series of attaching fingers adapted to engage an intermediate flange of the tire rim.

3. In a cover structure for a wheel including a multi-flanged tire rim part and a wheel body part, a circular wheel cover including a radially outer annular portion of form-sustaining but resiliently deflectable plastic material adapted to be disposed over the exposed flanges of said rim part, and retaining means for said cover comprising an inner retaining ring extending generally axially and having a radially outwardly opening groove therein, and an outer retaining ring having a clamping flange extending generally radially inwardly and bearing edgewise against an interposed inner marginal portion of the annular portion to clamp it in said groove.

4. In a cover structure for a wheel including a multi-flanged tire rim part and a wheel body part, a circular wheel cover including a radially outer annular portion of form-sustaining but resiliently deflectable plastic material adapted to be disposed over the exposed flanges of said rim part, and retaining means for the said cover comprising an inner retaining ring extending generally axially and having a radially outwardly opening groove therein, and an outer retaining ring having a clamping flange extending generally radially inwardly and bearing edgewise against an interposed inner marginal portion of the annular portion to clamp it in said groove, said outer retaining ring having a body portion of substantially S-shaped cross section and a radially outwardly extending flange connected by said body in offset relation to said clamping flange and formed with generally radially outwardly and axially outwardly extending fingers adapted for wedgingly engaging an intermediate flange of the tire rim for attaching the cover assembly to the wheel.

5. In a cover structure for a wheel including a multi-flanged tire rim part and a wheel body part, a trim ring member of a resilient plastic material adapted to cover the outer side of the tire rim and extending on a generally axially and radially inward curve, said trim ring having an inner generally axially extending flange portion, a retaining ring for retainingly engaging the tire rim and having a radially inner portion thereof in engagement with the radially outer side of said flange, and a second retaining ring clampingly cooperative with said outer retaining ring to clamp said cover flange therebetween and interengaging with said outer retaining ring in snap-on, pry-off relationship.

6. In a cover structure for a wheel including a multi-flanged tire rim part and a wheel body part, a trim ring member of a resilient plastic material adapted to cover the outer side of the tire rim and extending on a generally axially and radially inward curve, said trim ring having an inner, generally axially extending flange portion, a retaining ring for retainingly engaging the tire rim and having a radially inner portion thereof in engagement with the radially outer side of said flange, and a second retaining ring clampingly cooperative with said outer retaining ring to clamp said cover flange therebetween and interengaging with said outer retaining ring in snap-on, pry-off relationship, said inner retaining ring having an axially inner portion adapted to engage the wheel body in the fully assembled relationship of the retaining ring with the trim ring.

7. In a cover structure for a wheel including a multi-flanged tire rim part and a wheel body part, a trim ring member of a resilient plastic material adapted to cover the outer side of the tire rim and extending on a generally axially and radially inward curve, said trim ring having an inner generally axially extending flange portion, a retaining ring for retainingly engaging the tire rim and having a radially inner portion thereof in engagement with the radially outer side of said flange, and a second retaining ring clampingly cooperative with said outer retaining ring to clamp said trim ring flange therebetween and interengaging with said outer retaining ring in snap-on, pry-off relationship, said second retaining ring having an axially outer portion thereof affording a flexure backing for the contiguous marginal portion of the trim ring adapting the latter to be flexed axially outwardly without undue bending strain, said backing portion being disposed in spaced relationship to the first mentioned retaining ring whereby to permit the trim ring to be freely flexed inwardly to a limited extent.

8. In combination in a cover structure for application in ornamental covering relation to the outer side of a vehicle wheel including a tire rim and a wheel body part, a trim ring member having an inner marginal generally axially inwardly extending flange portion, a relatively rigid circular member engaging the radially inner side of said marginal portion of the trim ring member, and a retaining ring engaging the radially outer side of said marginal flange portion of the trim ring and clamping the same against said inner circular member, one of said members being retainingly engageable with the wheel for maintaining the cover assembly on the wheel, said inner circular member having an axially inwardly extending marginal portion engageable against the wheel body part.

9. In a cover assembly for disposition on the outer side of a vehicle wheel including tire rim and body portions, a trim ring member having an inner marginal flange portion extending generally axially inwardly, a generally axially extending circular inner cover portion engaging the radially inner side of said marginal flange portion, and a retaining ring extending generally radially and having an inner edge engaging the radially outer side of said flange portion and clampingly holding the flange against the inner circular cover portion, the radially outer portion of said retaining ring member comprising means for readily connecting the cover assembly to the wheel with the trim ring member concealing the tire rim and the juncture of the tire rim and the wheel body.

10. In a wheel cover of the character described, a trim ring portion having a generally axially inwardly extending inner marginal flange, an inner generally axially extending retaining ring engaging said marginal flange and having a generally radially inwardly convergent cross section affording a radially outwardly opening intermediate annular groove, the axially inner and axially outer edges of said inner ring being beaded for reinforcement, and an outer retaining ring extending generally radially and having its inner edge portion engaging against the radially outer side of said trim ring flange and clamping the same in said groove, the radially outer margin of said outer retaining ring being formed with a series of radially outwardly extending tire rim engaging fingers adapted for endwise retaining engagement with the generally axially extending intermediate flange of a multi-flange tire rim of a wheel against which the cover may be applied.

GEORGE ALBERT LYON.

REFERENCES CITED

The following references are of record in the file of this patent:

UNITED STATES PATENTS

| Number | Name | Date |
| --- | --- | --- |
| D. 141,494 | Lyon | June 5, 1945 |
| D. 141,508 | Lyon | June 5, 1945 |
| 2,368,253 | Lyon | Jan. 30, 1945 |